US012693763B2

(12) United States Patent
Chang et al.

(10) Patent No.:     US 12,693,763 B2
(45) Date of Patent:         Jul. 28, 2026

(54) SIGNAL PROCESSING METHOD AND RELATED CIRCUIT

(71) Applicant: HIMAX TECHNOLOGIES LIMITED, Tainan City (TW)

(72) Inventors: Yaw-Guang Chang, Tainan City (TW); Ren-Yuan Huang, Tainan City (TW); Yi-Yang Tsai, Tainan City (TW); Hao-Cheng Tsai, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 18/380,210

(22) Filed: Oct. 16, 2023

(65) Prior Publication Data

US 2025/0123711 A1     Apr. 17, 2025

(51) Int. Cl.
*G06F 3/041*          (2006.01)
*G06F 3/044*          (2006.01)

(52) U.S. Cl.
CPC ........ *G06F 3/0418* (2013.01); *G06F 3/04166* (2019.05); *G06F 3/044* (2013.01); *G06F 2203/04107* (2013.01)

(58) Field of Classification Search
CPC ........ G06F 3/041; G06F 3/044; G06F 3/0418; G06F 3/04166; G06F 2203/04107; G09G 3/32; G09G 3/20
See application file for complete search history.

(56) References Cited

U.S. PATENT DOCUMENTS

| | | | |
|---|---|---|---|
| 10,928,955 B1 * | 2/2021 | Reed ................... | G06F 3/04182 |
| 11,460,962 B1 * | 10/2022 | Zhang ................... | G06F 3/0418 |
| 2015/0324044 A1 * | 11/2015 | Chen ..................... | G06F 3/0412 |
| | | | 345/174 |
| 2021/0373736 A1 * | 12/2021 | Chen ................... | G06F 3/04184 |
| 2023/0400946 A1 * | 12/2023 | Yang ..................... | G06F 3/0418 |

* cited by examiner

*Primary Examiner* — Michael A Faragalla
(74) *Attorney, Agent, or Firm* — Winston Hsu

(57)                    ABSTRACT

A circuit, for a touch panel, comprises a plurality of touch signal processing circuits, coupled to a plurality of sensors of the touch panel to receive a plurality of touch signals, wherein when a first sensor within the plurality of sensors is touched, the first sensor generates a first touch signal of the plurality of touch signals; and a controller, coupled to the plurality of touch signal processing circuits, configured to adjust the first touch signal according to the plurality of touch signals except the first touch signal.

10 Claims, 7 Drawing Sheets

SIGNAL PROCESSING METHOD AND RELATED CIRCUIT

BACKGROUND OF THE INVENTION

1. Field of the Invention

The present invention relates to a signal processing method and a circuit for a touch panel, and more particularly, to a signal processing method and a circuit capable of performing noise removal on touch signals from a touch panel.

2. Description of the Prior Art

Touch panels, commonly found in devices such as notebooks or smartphones, are becoming increasingly integrated into the design of these devices to achieve a thinner and lighter form factor. This integration results in the touch panel and the display panel being positioned closer together, leading to an increasing in parasitic capacitances. These parasitic capacitances can introduce environmental noise into the touch signals, causing interference. As a result, there is an ongoing effort within the industry to mitigate the interference caused by the parasitic capacitances on touch signals.

Please refer to FIG. 1. FIG. 1 is a simplified schematic diagram of a conventional touch system 1. The touch system 1 includes a touch signal processing circuit 10, a touch panel 20 and an electrostatic discharge (ESD) protection circuit 30. The touch signal processing circuits 10 includes an analog to digital convertor (ADC) 102 and an adder 104. A reference signal Vref is input to the touch panel 20 through the adder 104 for detecting capacitance changes. The capacitance changes are affected by an ESD protection capacitance CESD of the ESD protection circuit 30, a touch capacitance Csig on the touch panel 20 due to user's touches, gestures, etc. and a parasitic capacitance Cp. It should be noted that the parasitic capacitance Cp includes all parasitic capacitances on or between the touch panel 20 and a display panel (not shown in FIG. 1), e.g. a sensor to gate line capacitance, a sensor to data line capacitance, an electrode to electrode capacitance, a data line to gate line capacitance, etc., but is not limited thereto. Furthermore, the capacitance changes may be converted into analog touch signals and be input to the ADC 102 for subsequent operations.

It should be noted that as the distance between the touch panel 20 and the display panel is getting smaller, the impact of the parasitic Cp on the analog touch signals may be much greater than the impact of the touch capacitance Csig on the analog touch signals, which may cause a bandwidth of the analog touch signals to be small, an offset electrical charge to be large, and an environmental noise Vnoise injected through the parasitic capacitance Cp to be serious. In other words, a signal to noise ratio (SNR) of the ADC 102 may drop significantly. In order to improve the shortcomings of the touch system 1, the present invention adds a noise cancellation circuit to reduce the influence of the parasitic capacitance Cp and the environmental noise Vnoise on the touch system 1.

SUMMARY OF THE INVENTION

The present invention is to provide a signal processing method and a circuit to solve the above problems.

An embodiment of the present invention provides a circuit, for a touch panel, comprising a plurality of touch signal processing circuits, coupled to a plurality of sensors of the touch panel to receive a plurality of touch signals, wherein when a first sensor within the plurality of sensors is touched, the first sensor generates a first touch signal of the plurality of touch signals; and a controller, coupled to the plurality of touch signal processing circuits, configured to adjust the first touch signal according to the plurality of touch signals except the first touch signal.

An embodiment of the present invention provides a signal processing method, for a touch panel comprising a plurality of sensors, comprising receiving a plurality of touch signals from the plurality of sensors, wherein when a first sensor within the plurality of sensors is touched, the first sensor generates a first touch signal of the plurality of touch signals; and adjusting the first touch signal according to the plurality of touch signals except the first touch signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
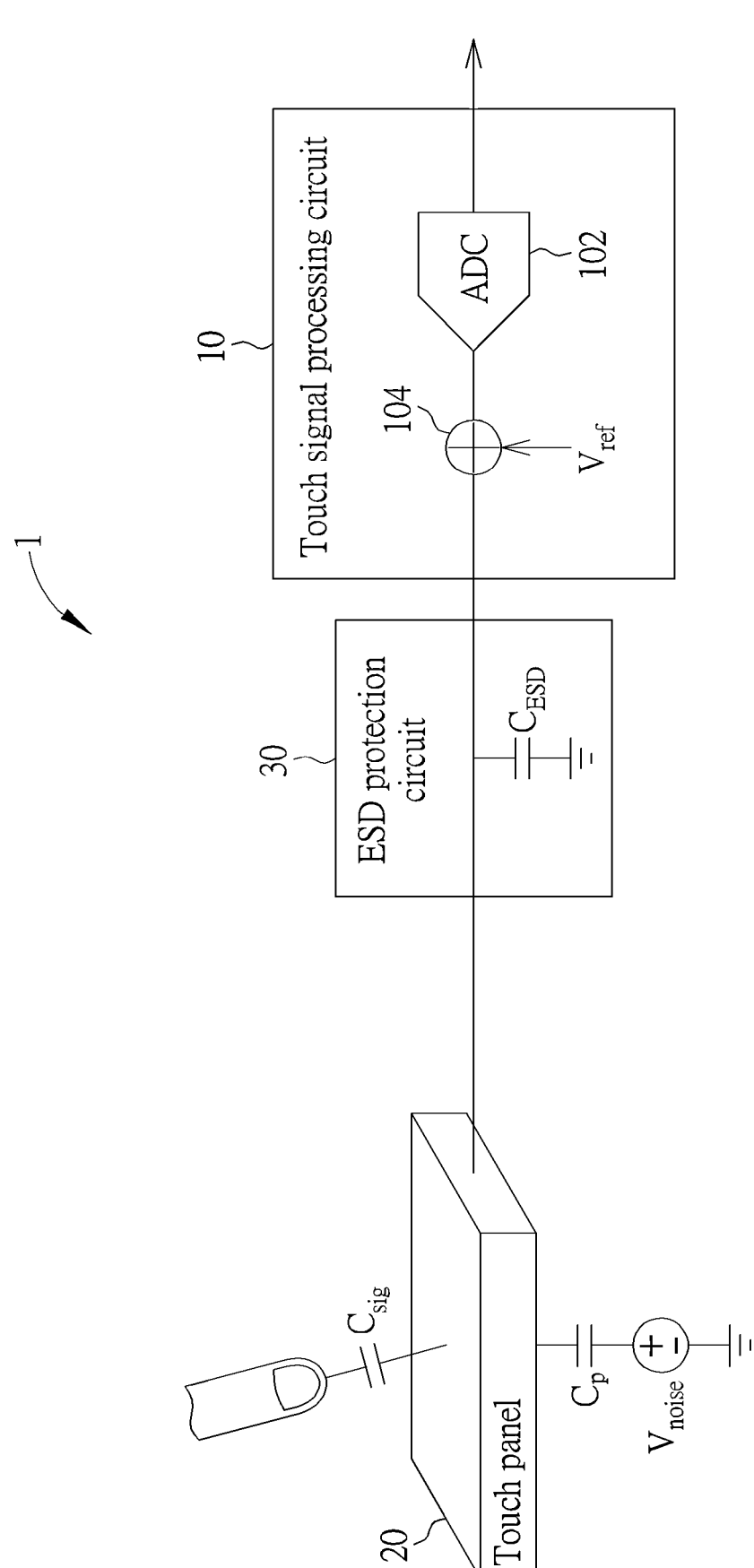
FIG. 1 is a simplified schematic diagram of a conventional touch system.
Figure 2:
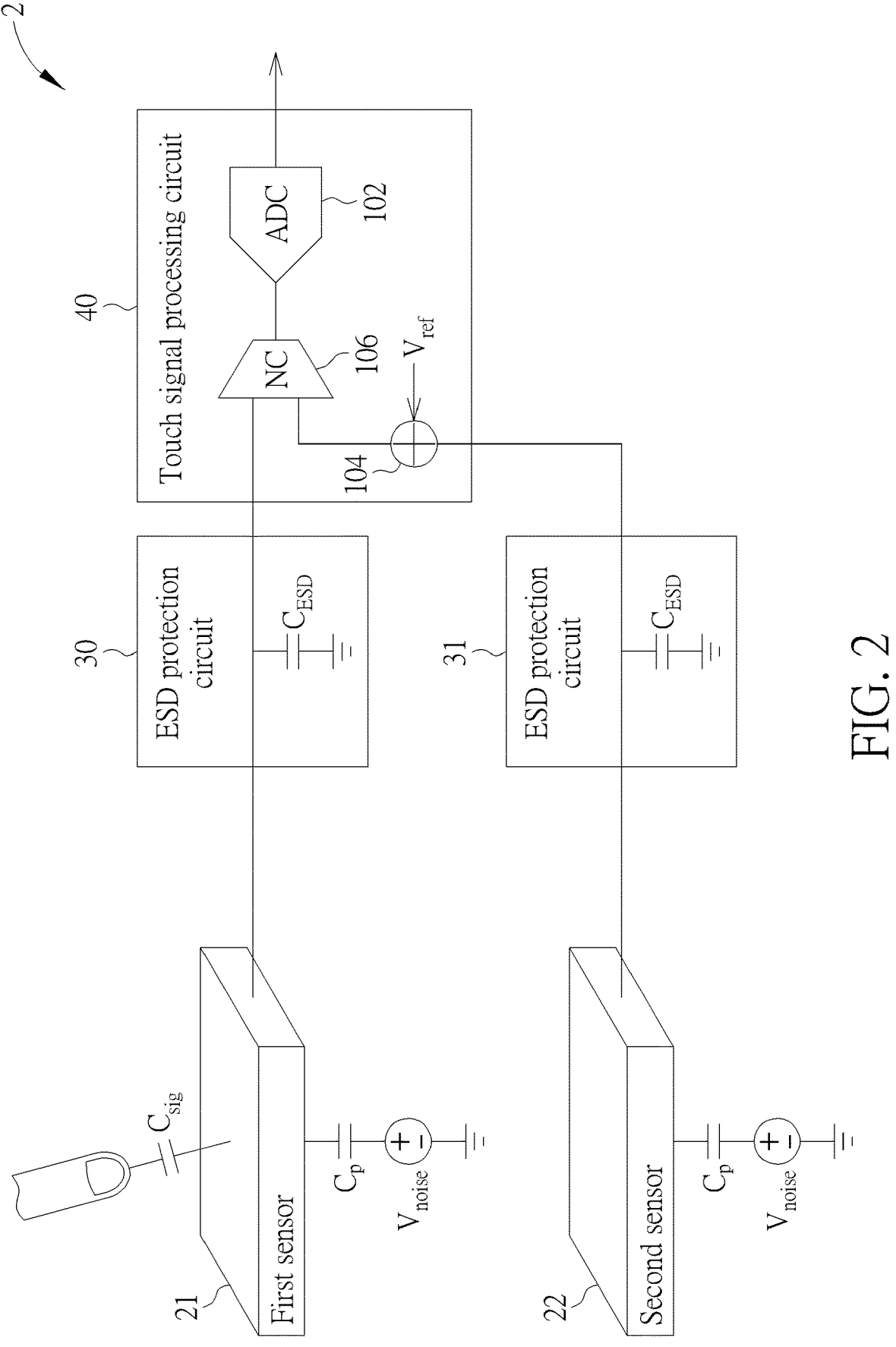
FIG. 2 is a schematic diagram of a touch system according to an embodiment of the present invention.

In detail, please refer to FIG. 2. FIG. 2 is a schematic diagram of a touch system 2 according to an embodiment of the present invention. The touch system 2 is derived from the touch system 1, so the elements are represented by the same symbols. The difference between the touch system 2 and the touch system 1 is that a touch signal processing circuit 40 of the touch system 2 further includes a noise cancellation (NC) circuit 106 for reducing the influence of the parasitic capacitance $C_p$ and the environmental noise $V_{noise}$ thereon. For the sake of brevity, FIG. 2 only illustrates a first sensor 21 and a second sensor 22 of various blocks within the touch panel 20 as a representative of a plurality of sensors for receiving the analog touch signals due to user's touches, gestures, etc. Specifically, when the touch panel 20 is not touched and is interfered by the environmental noise $V_{noise}$, the parasitic capacitance $C_p$ and the ESD protection capacitance $C_{ESD}$, a first analog touch signal received from the first sensor 21 and a second analog touch signal received from the second sensor 22 of the touch panel 20 may be the same or similar. The NC circuit 106 is configured to electrically couple to the first sensor 21 and the second sensor 22 of the touch panel 20 for receiving the first analog touch signal and the second analog touch signal. In an embodiment, when the first sensor 21 is touched and the second sensor 22 is not touched, the NC circuit 106 may adjust the first analog touch signal according to the second analog touch signal to obtain the adjusted first analog touch signal that is virtually not interfered by the environmental noise $V_{noise}$, the parasitic capacitance $C_p$ and the ESD protection capacitance $C_{ESD}$. For example, the NC circuit 106 may subtract the first touch signal and the second touch signal to obtain the adjusted first analog touch signal.

In short, the first analog touch signal includes a touch component and a noise floor component, and the second analog touch signal only includes the noise floor component. By subtracting the two analog touch signals, the adjusted first analog touch signal may only leave the touch component related to the touch capacitance $C_{sig}$ due to user's touches, gestures, etc.

Figure 3:
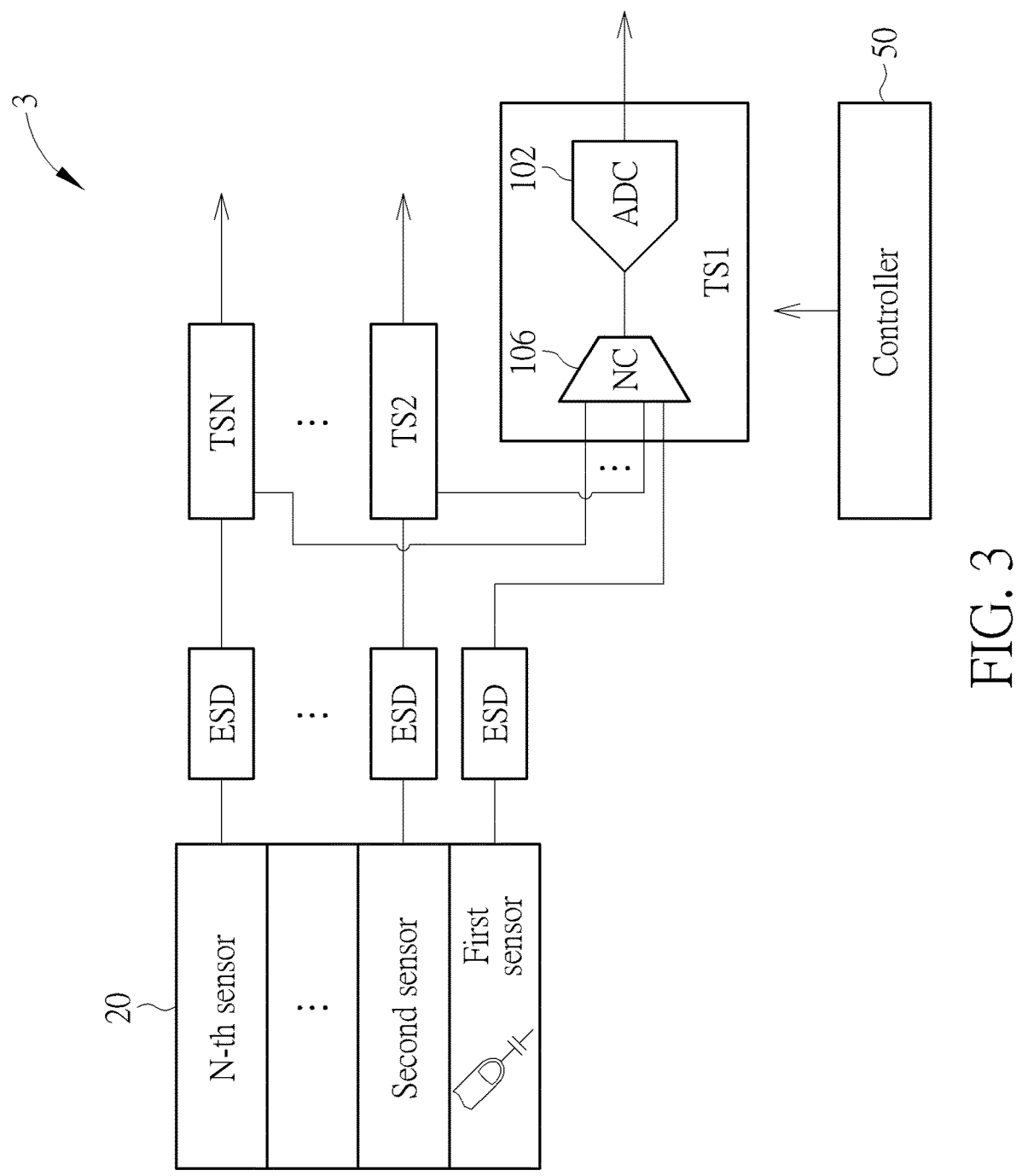
FIG. 3 is a schematic diagram of a touch system according to an embodiment of the present invention.
Figure 4:
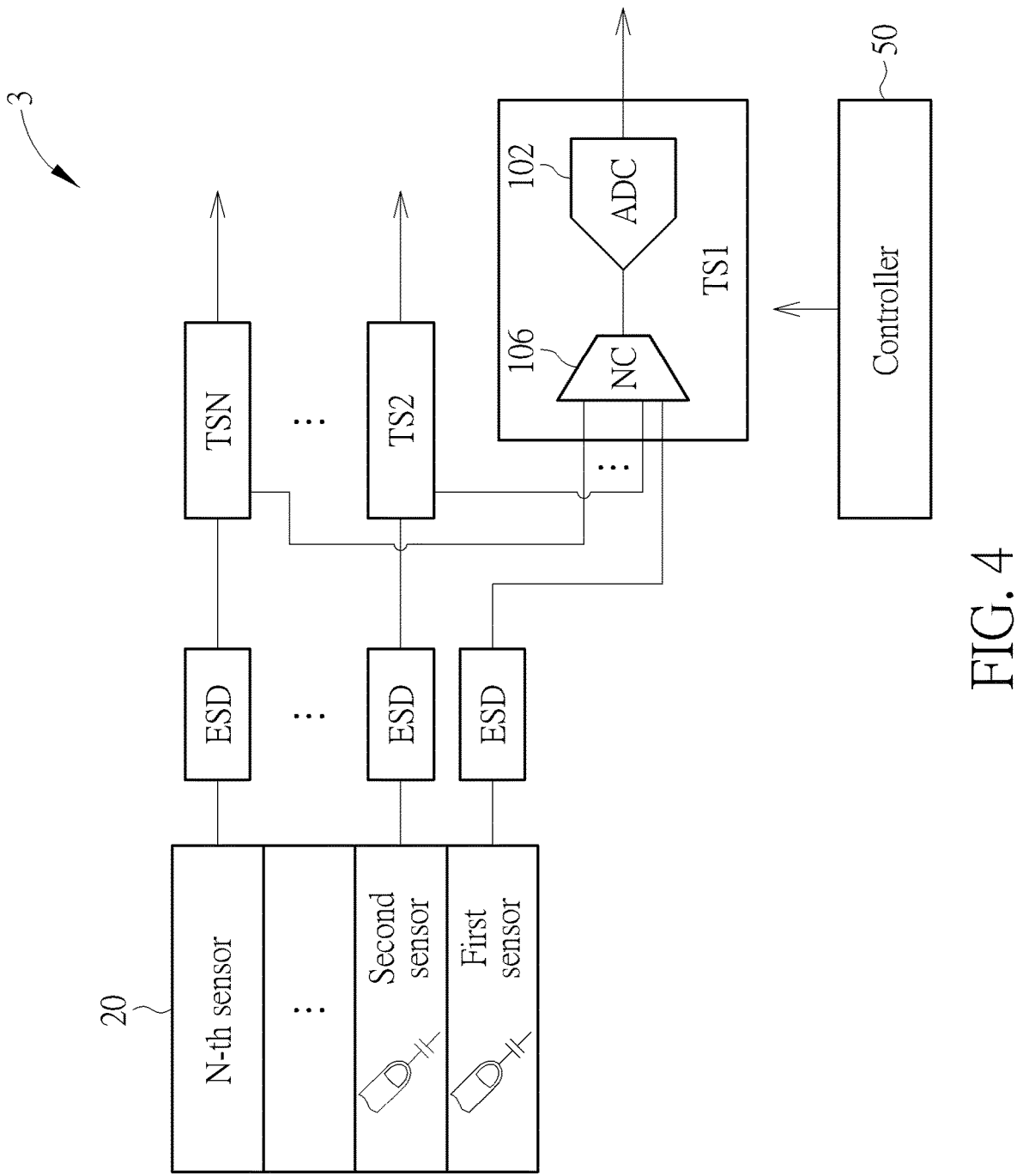
FIG. 4 is a schematic diagram of a touch system according to an embodiment of the present invention.

However, in a more realistic scenario, the path used for compensation in the NC circuit 106 may not be coupled to the untouched sensor (the second touch sensor in FIG. 2), so the adjusted first analog touch signal may also include a touch error related to the touch component of the second analog touch signal. In a detailed embodiment, please refer to FIG. 3 and FIG. 4. FIG. 3 and FIG. 4 illustrate schematic diagrams of a touch system 3 according to embodiments corresponding to various scenarios of the present invention. As shown in FIG. 3 and FIG. 4, the touch system 3 includes N touch signal processing circuits TS1-TSN electrically connected to N sensors of the touch panel 20 for respectively receiving N analog touch signals. In the scenario in FIG. 3 where the first sensor is touched and the N sensors except the first sensor are not touched, the NC circuit 106 of the touch signal processing circuit TS1 may adjust a first analog touch signal of the N analog touch signals according to the N analog touch signals except the first analog touch signal to obtain the adjusted first analog touch signal that is virtually not interfered by the environmental noise $V_{noise}$, the parasitic capacitance $C_p$ and the ESD protection capacitance $C_{ESD}$. On the other hand, in the scenario in FIG. 4 where the first sensor is touched and at least one sensor of the N sensors except the first sensor is also touched (e.g. the second sensor is touched), the NC circuit 106 of the touch signal processing circuit TS1 may adjust a first analog touch signal of the N analog touch signals according to the N analog touch signals except the first analog touch signal to obtain the adjusted first analog touch signal that is also virtually not interfered by the environmental noise $V_{noise}$, the parasitic capacitance $C_p$ and the ESD protection capacitance $C_{ESD}$. The detail description and derivative changes of the touch system 3 are described as above, and will not repeated here. It should be noted that, the adjusted first analog touch signal may include the averaged touch component of the second touch signal generated by the second sensor that is much lighter than the original noise floor component of the first analog touch signal.

In an embodiment, the touch system 3 may further include a controller 50. The controller 50 may control the N touch signal processing circuits TS1-TSN to process the above-mentioned function. For example, the controller 50 controls the NC circuit 106 to average N analog touch signals except the first analog touch signal and generate a first compensation touch signal. Then, the controller 50 controls the NC circuit 106 to subtract the first analog touch signal and the first compensation touch signal to obtain the adjusted first analog touch signal. In another embodiment, in the scenario in FIG. 4, the controller 50 may further perform or control the NC circuit 106 to perform a compensation algorithm to adjust the first compensation touch signal to obtain a second compensation touch signal, so that the second compensation touch signal does not include the touch component of the second analog touch signal. In this way, the controller 50 controls the NC circuit 106 to subtract the first analog touch signal and the second compensation touch signal to obtain the adjusted first analog touch signal that is virtually not interfered by the touch component of the second analog touch signal and the noise floor component due to the environmental noise $V_{noise}$, the parasitic capacitance $C_p$ and the ESD protection capacitance $C_{ESD}$.

Figure 5:
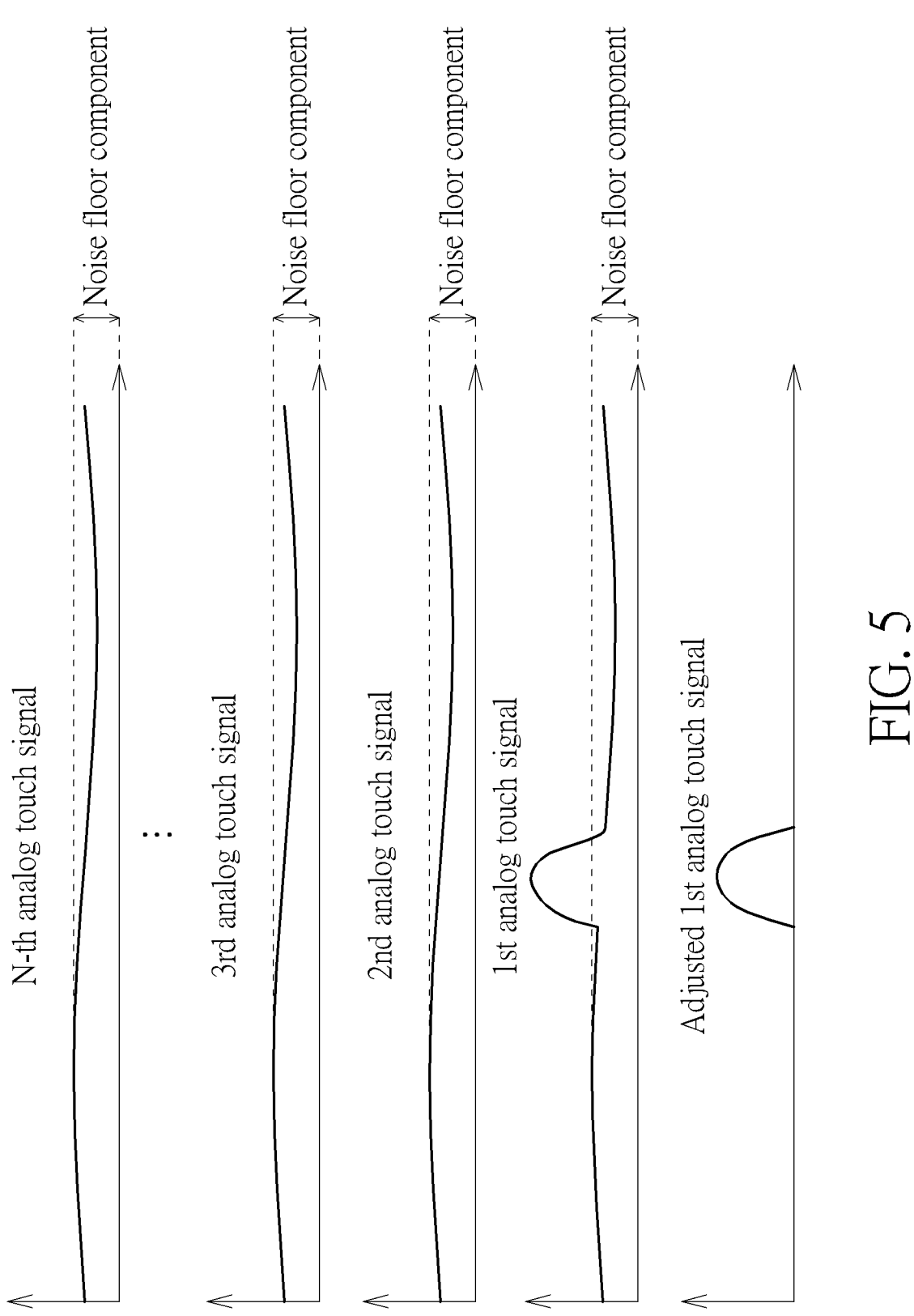
FIG. 5 illustrates schematic diagrams of analog touch signals and an adjusted analog touch signal according to the embodiment in FIG. 3 of the present invention.
Figure 6:
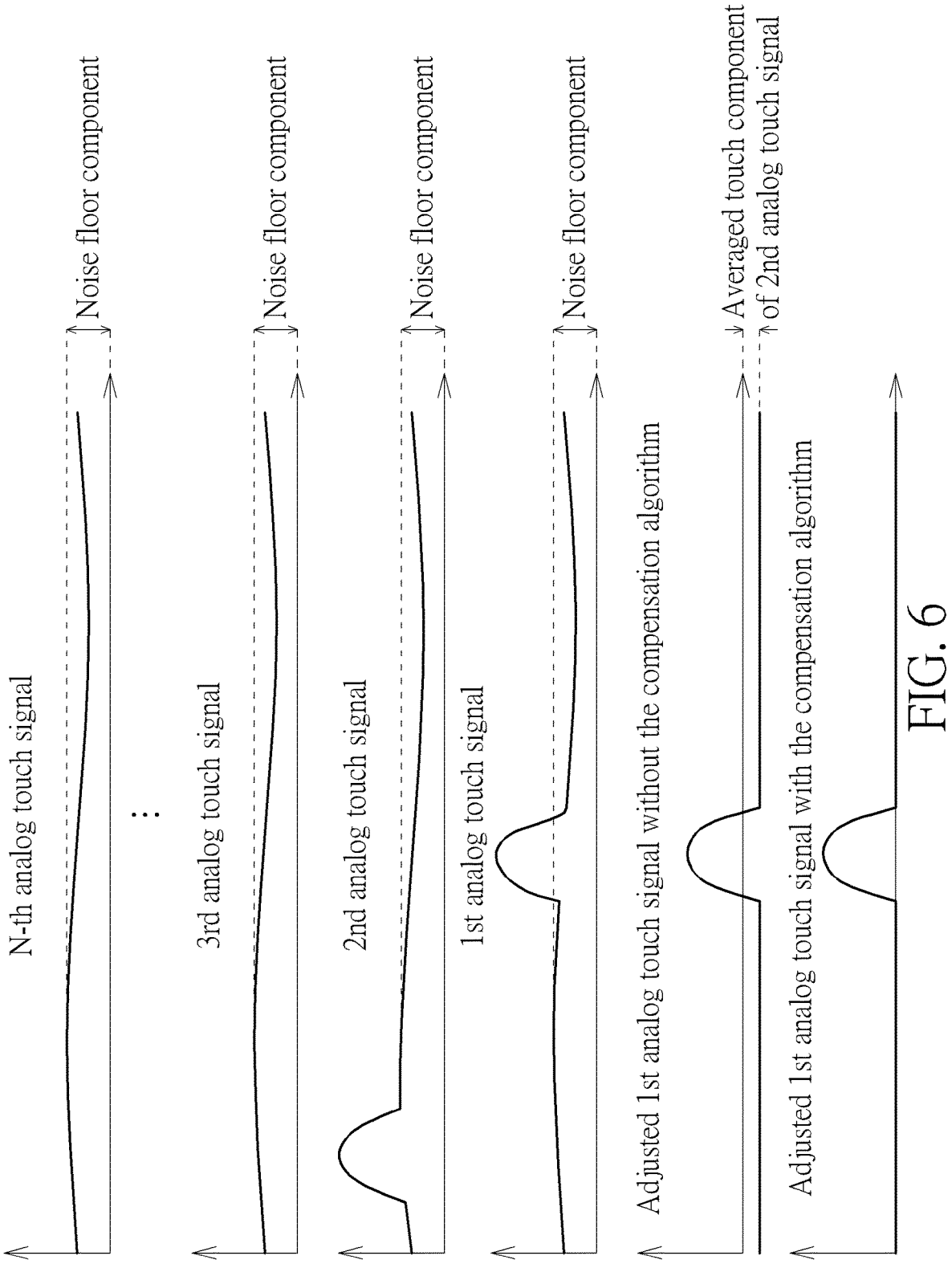
FIG. 6 illustrates schematic diagrams of analog touch signals and an adjusted analog touch signal according to the embodiment in FIG. 4 of the present invention.

For noise cancellation in the scenarios in FIG. 3 and FIG. 4, please refer to FIG. 5 and FIG. 6. FIG. 5 illustrates a schematic diagram of the N analog touch signals and the adjusted first analog touch signal according to the embodiment corresponding to the scenario in FIG. 3 of the present invention. As shown in FIG. 5, the N analog touch signals are affected by the environmental noise $V_{noise}$, the parasitic capacitance $C_p$ and the ESD protection capacitance $C_{ESD}$ (represented as noise floor), and have the noise floor components greater than zero. In addition, the first analog touch signal also includes the touch component due to the user's touch. It should be noted that the adjusted first analog touch signal is subtracted from the first analog touch signal and the average of N analog touch signals except the first analog touch signal. Therefore, the adjusted analog first touch signal only leaves the touch component due to the user's touch and is not interfered by the noise floor component. On the other hand, FIG. 6 illustrates a schematic diagram of the N analog touch signals and the adjusted first analog touch signal according to the embodiment corresponding to the scenario in FIG. 4 of the present invention. The difference between FIG. 5 and FIG. 6 is that the second sensor is also touched and the second analog touch signal also includes the touch component due to the user's touch. As shown in FIG. 6, the adjusted first analog touch signal without undergoing the compensation algorithm includes the averaged noise floor component, which is due to the second analog touch signal. On the other hand, the adjusted first analog touch signal having undergone the compensation algorithm only leaves the touch component due to the user's touch and is not interfered by the noise floor component of the second analog touch signal.

It should be noted that examples of the touch panel 20 may include conformal, self-sensing or mutual-sensing touch panels applied in LCD, OLED or AMOLED, but not limited thereto. Furthermore, the N analog touch signals may be voltage signals or current signals, and those skilled in the art may make appropriate designs to implement the NC circuit 106 or the controller 50. For example, if the N analog touch signals are current signals, the NC circuit 106 may be implemented as a current mirror circuit to accumulate and average the current signals. It should be noted that the current mirror circuit is well known in the art, and will not repeated here.

Figure 7:
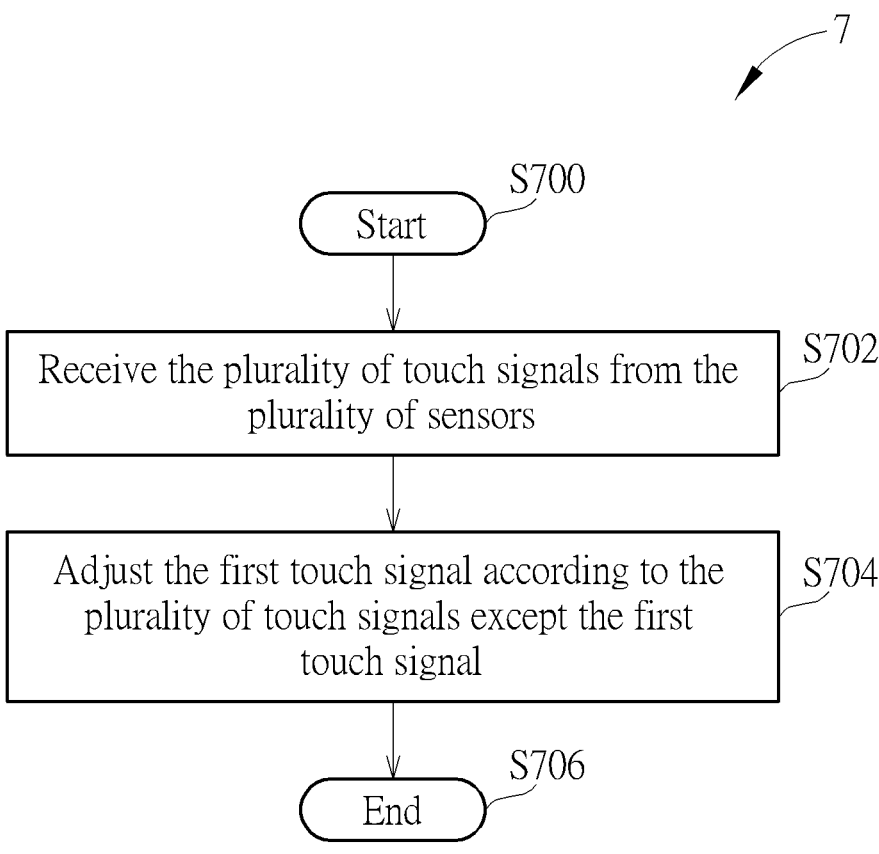
FIG. 7 is a flowchart of a signal processing method according to an embodiment of the present invention.

The operations of the touch systems 2 and 3 may be summarized as a signal processing method 7, as shown in FIG. 7. The signal processing method 7 includes the following steps:

Step S700: Start.

Step S702: Receive the plurality of touch signals from the plurality of sensors.

Step S704: Adjust the first touch signal according to the plurality of touch signals except the first touch signal.

Step S706: End.

The detail description and derivative changes of the signal processing method 7 are described as above, and will not repeated here.

It should be noted that the touch systems 2 and 3 are different embodiments of the present invention. Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (COM) and the touch systems 2-3. Any of the abovementioned procedures and examples above may be compiled into program codes or instructions that are stored in a storage unit. The storage unit may include read-only memory (ROM), flash memory, random access memory (RAM), subscriber identity module (SIM), hard disk, or CD-ROM/DVD-ROM/BD-ROM, but not limited thereto. The controller 50 may read and execute the program codes or the instructions stored in the storage unit for realizing the abovementioned functions.

In summary, the touch system of the present invention uses the N analog touch signals to adjust each other and performs a compensation algorithm to obtain the adjusted analog touch signals that are virtually not interfered by the other analog touch signals, the environmental noise $V_{noise}$, the parasitic capacitance $C_p$ and the ESD protection capacitance $C_{ESD}$. In this way, the SNR of the ADCs may be significantly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit, for a touch panel, comprising:

a first touch signal processing circuit, configured to receive a first touch signal generated by a first sensor of the touch panel, wherein the first sensor is touched;

a second touch signal processing circuit, configured to receive a second touch signal generated by a second sensor of the touch panel;

a third touch signal processing circuit, configured to receive a third touch signal generated by a third sensor of the touch panel; and a controller, coupled to the first touch signal processing circuit, the second touch signal processing circuit and the third touch signal processing circuit, configured to process the second touch signal and the third touch signal to adjust the first touch signal, wherein at least one sensor of the second sensor and the third sensor is touched.

2. The circuit of claim 1, wherein each touch signal processing circuit of the first touch signal processing circuit, the second touch signal processing circuit and the third touch signal processing circuit comprises a compensation circuit;

wherein the compensation circuit of the first touch signal processing circuit is configured to process the second touch signal and the third touch signal and generate a first compensation touch signal;

wherein the controller adjusts the first touch signal according to the first compensation touch signal.

3. The circuit of claim 2, wherein the compensation circuit of the first touch signal processing circuit averages the second touch signal and the third touch signal and generates the first compensation touch signal.

4. The circuit of claim 2, wherein the controller further adjusts the first compensation touch signal and generates a second compensation touch signal according to a compensation algorithm when at least one sensor of the second sensor and the third sensor is touched, and the controller adjusts the first touch signal according to the second compensation touch signal.

5. The circuit of claim 1, wherein the controller further adjusts the first touch signal according to a compensation algorithm when at least one sensor of the second sensor and the third sensor is touched.

6. A signal processing method, for a touch panel comprising a first sensor, a second sensor and a third sensor, comprising:

receiving a first touch signal generated by the first sensor, wherein the first sensor is touched;

receiving a second touch signal generated by the second sensor;

receiving a third touch signal generated by the third sensor; and processing the second touch signal and the third touch signal to adjust the first touch signal;

wherein at least one sensor of the second sensor and the third sensor is touched.

7. The signal processing method of claim 6, wherein the step of processing the second touch signal and the third touch signal to adjust the first touch signal comprises:

processing the second touch signal and the third touch signal and generating a first compensation touch signal; and adjusting the first touch signal according to the first compensation touch signal.

8. The signal processing method of claim 7, wherein the step of processing the second touch signal and the third touch signal and generating the first compensation touch signal comprises:

averaging the second touch signal and the third touch signal and generating the first compensation touch signal.

9. The signal processing method of claim 7, further comprising:

adjusting the first compensation touch signal and generating a second compensation touch signal according to a compensation algorithm when at least one sensor of the second sensor and the third sensor is touched; and adjusting the first touch signal according to the second compensation touch signal.

10. The signal processing method of claim 6, further comprising:

adjusting the first touch signal according to a compensation algorithm when at least one sensor of the second sensor and the third sensor is touched.

* * * * *